Figure 1:
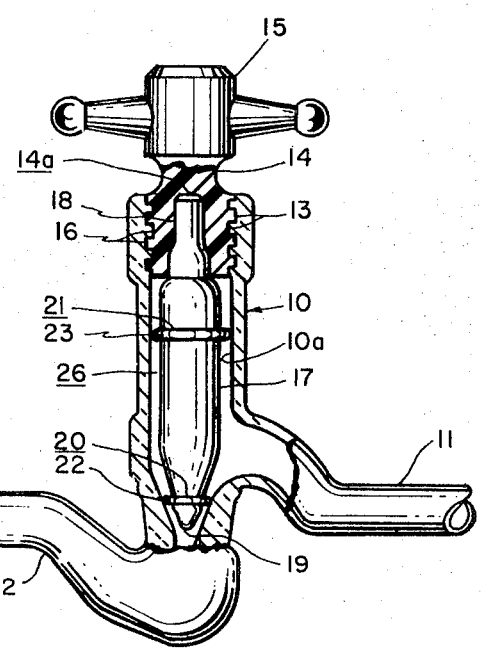

United States Patent
Peters et al.

[15] 3,658,290
[45] Apr. 25, 1972

[54] FLOATING GLASS PLUG FOR STOPCOCK ASSEMBLY

[72] Inventors: Eugene R. Peters; Walter H. Rutherford, both of Torrance, Calif.

[22] Filed: Dec. 14, 1970

[21] Appl. No.: 97,552

[52] U.S. Cl. ..............................251/215, 251/88, 251/368, 137/608, 251/DIG. 3
[51] Int. Cl. ..............................................................F16k 31/50
[58] Field of Search ..........................251/214, 215, 368, 122; 137/315; 23/292

[56] References Cited

UNITED STATES PATENTS

| 2,669,415 | 2/1954 | Gilroy | 251/215 |
| 2,796,887 | 6/1957 | Stern | 251/368 X |
| 3,112,759 | 12/1963 | De Lucia | 137/315 |
| 3,194,533 | 7/1965 | McLay | 251/368 X |
| 3,490,736 | 1/1970 | Snyder | 251/368 X |

Primary Examiner—M. Cary Nelson
Assistant Examiner—David R. Matthews
Attorney—Daniel T. Anderson, James V. Tura and Jerry A. Dinardo

[57] ABSTRACT

A floating glass plug for a stopcock is employed in a high vacuum. The glass plug is spaced from the stopcock barrel by O-ring seals and a threaded sleeve of teflon, nylon, etc. The glass plug is less expensive than one constructed solely of teflon or of ground glass, and is considerably more effective in service.

11 Claims, 3 Drawing Figures

PATENTED APR 25 1972

3,658,290

Eugene R. Peters
Walter H. Rutherford
INVENTORS

BY
James V. Tura
ATTORNEY

FLOATING GLASS PLUG FOR STOPCOCK ASSEMBLY

BACKGROUND OF THE INVENTION

This invention relates to a new and improved glass plug for a stopcock. More specifically, this invention relates to a molded glass plug having O-ring seals and having a threaded sleeve of nylon, teflon, etc. to produce a low friction surface with its associated barrel. The sleeve and O-rings space the plug from the barrel and provide effective service at high vacuum.

The use of greaseless plugs such as teflon in stopcocks is well known and provides a suitable and, in some cases, necessary alternative to the use of ground glass stopcocks; the latter requires a grease or lubricant to produce a seal and provides a low friction sliding surface with the barrel. When used in conjunction with O-rings, teflon plugs provide a fairly good vacuum seal.

U.S. Pats. No. 3,194,533 and No. 3,323,874 are typical patents disclosing the use of teflon plugs in a stopcock assembly. Commercial brochures such as distributed by the West-Glass Corporation also disclose the use of teflon plugs in a high vacuum environment.

However, when using a teflon plug in a high-vacuum and particularly in a high-temperature environment, serious degassing or loss of vacuum can occur during operation.

After extended use of a teflon plug in a corrosive vapor environment, the teflon plug may deteriorate and thereby necessitate its replacement. In fact, the teflon plug itself tends to deteriorate in a manner such that serious degassing will occur. Teflon itself is an expensive material.

When a ground glass plug is employed in a stopcock, it cannot be utilized at high temperatures because the grease used to seal the system will melt; this will cause the plug to seize or lose vacuum, or both. Both teflon and ground glass plugs are expensive since they must be machined or ground to a close fit to maintain a proper seal.

Consequently, a need exists, and it is an object of this invention to provide a plug and stopcock assembly which does not require grease, is inexpensive, and is effective from the standpoint of maintenance and long term durability.

It has now been discovered that it is feasible to employ a molded glass plug in a stopcock by spacing the glass portion of the plug from the interior wall of the stopcock barrel. The spacing is provided on one end of the plug by a thread engaging portion of teflon (or other suitable polymer) to produce a low friction surface with the barrel threads. The spacing between the other end of the plug and barrel is effected with conventional O-rings. The glass plug thus actually floats or is suspended in the barrel while in operation and results in considerably less vacuum loss as compared to a teflon plug. Also it is much less expensive than either a teflon or a ground glass plug.

It might be expected that because of its greater coefficient of expansion ($9.9 \times 10^{-5}/°C$), compared to glass ($5.5 \times 10^{-7}$ to $1.25 \times 10^{-5}/°C$), a teflon plug would effect a greater compression on the O-rings during a thermal cycle than would a glass plug and hence would provide a better vacuum seal.

However, it now appears that the principle factor in vacuum loss is attributable to absorption and desorption of gases from the teflon surface rather than due to leakage at the O-rings. Consequently, the present invention permits a stopcock having a glass plug in a spaced-apart relationship from its glass barrel to be utilized in a high vacuum.

Figure 3:
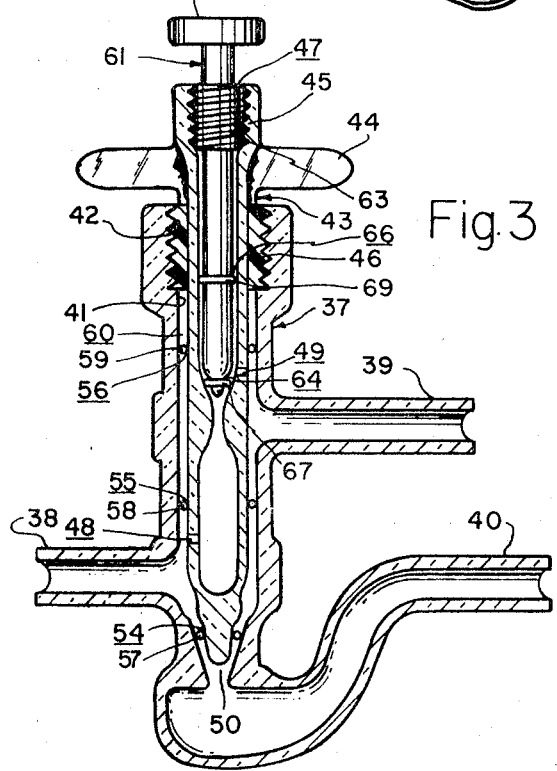
Figure 2:
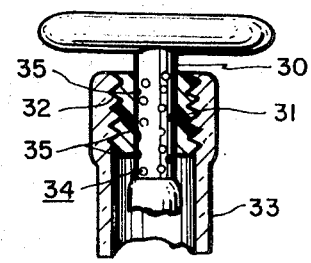

The invention will become more apparent from the description and the drawings to follow in which:

FIGS. 1-3 are sectional side elevations of three different embodiments of this invention.

In the embodiment of FIG. 1, the stopcock assembly provides a pyrex barrel 10 having inlet/outlet tubes 11 and 12 at the middle and lower portions of the barrel respectively. The upper portion of the barrel is provided on its surface 10a with a threaded section 13.

The plug portion of the stopcock assembly provides an upper portion 14 of a polymer such as teflon, nylon etc. and has a handle 15 at its upper end and threads 16 at its lower end for engaging the threads 13 of barrel 10. The teflon threads provide a low friction surface between the plug and the barrel. Other polymeric materials such as nylon, polypropylene, etc. may also be used to effect a low friction surface with the threaded portion of the glass barrel, provided they maintain suitable dimensional stability. A cavity portion 14a is provided along the central axis of the upper portion 14.

The lower glass portion of the plug comprises a round, cylindrical-shaped glass body 17, with stem 18, and rounded tip 19, the stem 18 fitting into the cavity 14a of the upper portion 14. Grooves 20 and 21 are provided near the lower and medial portions respectively of the glass plug. O-rings 22 and 23 are positioned respectively on grooves 20,21 to seal off inlet tube 11 and outlet tube 12 from each other and form a greaseless seal between the glass plug and the glass barrel when the stopcock is in service. The glass portion of the plug does not provide a tight fit with the inside wall 10a of the barrel, as would be the case if a ground glass plug were used. Instead, a space 26 is provided between the inside of the sidewall 10a and the glass plug, and O-rings 22 and 23 are compressed into the space 26 when the plug is screwed into the barrel. This provides an effective seal. Since the glass portion of the plug is molded rather than ground, its cost is reduced considerably.

FIG. 2 illustrates a second embodiment for this invention which employs a plug 30 made entirely of molded glass. A threaded insert 31 of teflon, nylon, etc. is positioned around the upper portion of the stopcock adjacent the handle to provide a greaseless, low friction surface with the interior threads 32 of the pyrex barrel 33. If desired, the plug 30 may be provided with one or more indentations 34, and the insert 31 has projections 35 which fit into these indentations. This will lock the insert relative to the glass body 30 and prevent it from turning when the plug is screwed into the barrel. The sleeve may also be secured to the plug with an adhesive.

FIG. 3 illustrates a third embodiment of this invention when employed in a three-way stopcock. FIG. 3 shows a pyrex glass barrel 37 with inlet/outlet tubes 38,39 and 40 and the interior sidewall 41 of the barrel having threads 42 at its upper end.

A molded glass plug 43 is positioned in the barrel to provide two-way relief between tubes 38 and 40. The plug is provided with an integral handle 44 at its upper end and a threaded teflon insert 46 on the upper outside periphery to provide a greaseless seal with the barrel threads 42. The plug defines a threaded portion 45 on its upper, inner periphery and a central axial cavity 47 extending to its bottom. Ports 48,49 are defined in the plug to coincide with inlet tubes 38 and 39 respectively; the tip of the plug 50 extends into entrance of inlet 40. Circumferential grooves 54,55,56 are provided on the plug to receive O-rings 57,58,59, respectively. A space 60 is defined between the plug 43 and inner wall 41 of the barrel 37.

A second molded glass plug 61 is positioned in the cavity 47 of plug 43. The plug 61 has a turning handle 62 at its upper end and a teflon insert 63 around its stem for engaging the threads 45 of plug 43. Peripheral grooves 64,66 are provided on the lower portion of the stem, and O-rings 67,69 are positioned respectively along the grooves 64,66 to provide a seal in the cavity 47 between outlets 38 and 39 and between outlet 39 and the teflon insert 63.

As the plug 43 is rotated, it will be raised axially along the barrel and unseat O-ring 57 from the entrance of inlet tube 40 to provide flow control between tubes 38 and 40. Similarly a two-way relief will be provided between tubes 38 and 39 if plug 61 is raised. A three-way relief is provided if both plugs 43 and 61 are raised. When the plug 43 is lowered by rotating, it will of course, cause the O-rings to be compressed into the space 60 to provide a vacuum seal.

The molded plugs in FIGS. 1-3 were all made of borosilicate pyrex glass (7740) having a coefficient of expansion of $3.3 \times 10^{-6}/°C$. However, other materials having glass-like properties such as pyroceram, quartz, fused silica, Vycor, etc. are also suitable and are included in the term "glass." The term "molded" includes: pressing, casting, rolling, drawing, etc.

The O-rings were made of a suitable elastomer such as Buna N, Viton, etc., the latter being a copolymer of vinylidene fluoride and hexafluoropropylene.

The following table indicates the effectiveness of a) a molded glass plug in a pyrex barrel (FIG. 2 type) using two different O-ring compositions, b) a teflon plug of the same shape and size also in a pyrex barrel, and c) a ground glass plug. The measurements were made under static vacuum conditions.

| Teflon Plug (Viton O-rings) | | | Molded Glass Plug (Viton O-rings) | | |
|---|---|---|---|---|---|
| Time (mins.) | Pressure (microns) | Temp. (°F) | Time (mins.) | Pressure (microns) | Temp. (°F) |
| 0 | 9 | 78 | 0 | 4 | 80 |
| 15 | 175 | 78 | 15 | 17 | 80 |
| 30 | 295 | 78 | 30 | 22 | 80 |
| 0 | 5 | 78 | 0 | 5 | 80 |
| 15 | 210 | 150 | 15 | 70 | 158 |
| 30 | 490 | 198 | 30 | 240 | 197 |

| Molded Glass Plug (O-rings using a cured polyolefin rubber containing a filler and polybutadiene) | | | Ground Glass Plug | | |
|---|---|---|---|---|---|
| Time (mins.) | Pressure (microns) | Temp. (°F) | Time (mins.) | Pressure (microns) | Temp. (°F) |
| 0 142 | 7 | 78 | 0 | 5 | 78 |
| 15 | 35 | 78 | 15 | 20 | 78 |
| 30 | 38 | 78 | 30 | 24 | 78 |
| 0 | 5 | 78 | | | |
| 15 | 34 | 154 | | | |
| 30 | 90 | 198 | | | |

It will be observed from the table that the degassing characteristics employing the glass plug (measured by the change in vacuum pressure) are significantly superior to the stopcock employing the teflon plug. Also, it will be noted that under static conditions, the rate of vacuum loss stabilized after about 15 minutes at room temperature when employing the molded glass plug, whereas the teflon plug still lost considerable vacuum.

Also, as compared to the much more expensive ground glass plug, degassing characteristics at ambient temperatures are equivalent. At higher temperatures, the ground glass plug is inoperable since the grease or lubricant employed as the seal for the ground glass plug will melt; this will cause the seal to be broken or the plug to freeze, or both.

Thus, the present invention provides a stopcock having substantially better degassing characteristics in a vacuum than one employing either a ground glass or a teflon plug. Also the stopcock may be employed in a fluid environment including liquid and gaseous to provide metered flow control.

Furthermore, since the glass plug is molded rather than ground, it is far less expensive to fabricate. Hence the necessity of a ground-fit barrel is eliminated and inexpensive O-rings may be employed instead.

Also, the O-rings may be replaced and the plug need only be cleaned if it becomes discolored by chemicals; by contrast, teflon plugs must be discarded if they are badly discolored or if they have interacted with the O-rings.

Finally, stopcocks employing the glass plug of the present invention can be employed at vacuum levels down to at least $10^{-10}$ mm Hg., whereas stopcocks employing a teflon plug do not maintain a sufficiently good vacuum to permit their use at anywhere near these levels.

What is claimed is:
1. A stopcock assembly comprising:
   a glass barrel, having inlet and outlet tubes, a sidewall portion, and a glass plug therefor;
   the plug being spaced from the internal sidewall of the barrel, and provided with a dimensionally stable polymeric threaded portion to engage and effect a low friction surface with the barrel upon rotation therewith; and
   O-rings positioned on the plug to provide a seal in the sidewall space between the inlet and the outlet tubes and a seal between the said tubes and the polymeric threaded portion upon axial movement of the plug along the barrel.
2. The stopcock of claim 1 in which the coefficient of expansion of the glass plug varies from about $5.5 \times 10^{-7}$ to about $1.25 \times 10^{-5}/°C$.
3. The stopcock assembly of claim 2 in which the glass plug is molded.
4. The stopcock assembly of claim 3 in which the the glass of the said plug is selected from the group consisting of pyrex, quartz, Vycor, fused silica and pyroceram.
5. A stopcock assembly comprising:
   a glass barrel, having inlet and outlet tubes, a sidewall portion, having internal threads thereon, and a glass plug therefor:
   the plug being spaced from the internal sidewall of the barrel, and provided with a dimensionally stable polymeric threaded portion to effect a low friction surface with the threads of the barrel upon rotation therewith; and
   O-rings positioned on the plug to provide a vacuum seal in the sidewall space between the inlet and outlet tubes and between the said tubes and the polymeric threaded portion upon axial movement of the plug along the barrel.
6. The stopcock assembly of claim 5 in which the coefficient of expansion of the glass plug varies from about $5.5 \times 10^{-7}$ to about $1.25 \times 10^{-5}/°C$.
7. The stopcock assembly of claim 6 in which the glass plug is molded.
8. The stopcock assembly of claim 7 in which the glass of the said plug is selected from the group consisting of pyrex, quartz, Vycor, fused silica and pyroceram.
9. A glass plug for a stopcock assembly comprising:
   a round, molded glass cylindrical-shaped lower body plug portion;
   an upper portion comprising a handle for moving said plug;
   a dimensionally stable polymeric insert disposed about said plug for engaging a glass stopcock barrel; and
   O-rings mounted on said body portion;
   the plug being shaped to provide a space between the barrel and
   being adapted to compress the O-rings into the space between the body portion and barrel and provide a seal therebetween when the plug is moved axially along and engages the barrel.
10. The plug of claim 9 in which the coefficient of expansion of the said glass body portion varies from about $5.5 \times 10^{-7}$ to about $1.25 \times 10^{-5}/°C$.
11. A stopcock assembly comprising:
   a glass barrel having inlet and outlet tubes, a sidewall barrel portion and a floating glass plug therefor;
   the plug being spaced from the internal sidewall of the barrel by a sleeve and by O-rings both mounted on said plug;
   the said sleeve being composed of a dimensionally stable polymeric material adapted to engage the barrel and effect a low friction surface therewith;
   the said O-rings being positioned on the plug to provide, upon compression, a seal in the sidewall space between the inlet and outlet tubes, and to provide, a seal between the said tubes and the sleeve.

* * * * *